(12) United States Patent
Matsumoto

(10) Patent No.: US 8,407,300 B2
(45) Date of Patent: Mar. 26, 2013

(54) RECORDING MEDIUM WITH ELECTRONIC MAIL MANAGEMENT PROGRAM RECORDED, COMMUNICATION TERMINAL, AND ELECTRONIC MAIL MANAGEMENT METHOD

(75) Inventor: Akiko Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 261 days.

(21) Appl. No.: 12/399,592

(22) Filed: Mar. 6, 2009

(65) Prior Publication Data

US 2009/0234929 A1    Sep. 17, 2009

(30) Foreign Application Priority Data

Mar. 11, 2008   (JP) .................. 2008-060986

(51) Int. Cl.
*G06F 15/16*   (2006.01)
(52) U.S. Cl. ......... 709/206; 709/207; 709/226; 709/229
(58) Field of Classification Search .................. 709/207, 709/226, 229, 206, 208
See application file for complete search history.

(56) References Cited

U.S. PATENT DOCUMENTS

| | | | | |
|---|---|---|---|---|
| 6,134,582 A * | 10/2000 | Kennedy | ................. | 709/206 |
| 6,310,694 B1 * | 10/2001 | Okimoto et al. | ............ | 358/1.15 |
| 6,351,763 B1 * | 2/2002 | Kawanaka | ................. | 709/206 |
| 6,601,088 B1 * | 7/2003 | Kelley et al. | ............... | 709/206 |
| 6,728,714 B1 * | 4/2004 | Doganata et al. | ............... | 1/1 |
| 7,054,905 B1 * | 5/2006 | Hanna et al. | ................. | 709/206 |
| 7,149,893 B1 * | 12/2006 | Leonard et al. | ............... | 713/154 |
| 7,222,156 B2 * | 5/2007 | Gupta et al. | ................. | 709/206 |
| 7,730,142 B2 * | 6/2010 | LeVasseur et al. | ........... | 709/206 |
| 7,783,711 B2 * | 8/2010 | LeVasseur et al. | ........... | 709/206 |
| 7,849,140 B2 * | 12/2010 | Abdel-Aziz et al. | .......... | 709/206 |
| 8,171,089 B2 * | 5/2012 | Nersu et al. | ................. | 709/206 |
| 2002/0026487 A1 * | 2/2002 | Ogilvie et al. | ............... | 709/206 |
| 2002/0156855 A1 * | 10/2002 | Ueno | ........................ | 709/206 |
| 2003/0023695 A1 * | 1/2003 | Kobata et al. | ............... | 709/206 |
| 2003/0187941 A1 * | 10/2003 | Suzuki | ........................ | 709/206 |
| 2004/0230642 A1 * | 11/2004 | Collet et al. | ................. | 709/200 |
| 2005/0132010 A1 * | 6/2005 | Muller | ........................ | 709/206 |
| 2008/0098237 A1 * | 4/2008 | Dung et al. | ................. | 713/189 |
| 2009/0157650 A1 * | 6/2009 | Chow et al. | ........................ | 707/5 |
| 2009/0234929 A1 * | 9/2009 | Matsumoto | ................. | 709/206 |
| 2010/0306545 A1 * | 12/2010 | Seki | ........................ | 713/175 |

FOREIGN PATENT DOCUMENTS

| | | |
|---|---|---|
| JP | A 10-55322 | 2/1998 |
| JP | A 2003-174481 | 6/2003 |
| JP | A 2006-146648 | 6/2006 |

* cited by examiner

*Primary Examiner* — Michael Won
(74) *Attorney, Agent, or Firm* — Greer, Burns & Crain, Ltd.

(57) ABSTRACT

An address set in a forwarding mail of an electronic mail received from a sender is obtained, a receiver having a delete program for deleting the forwarding mail is identified as the obtained destination, and the electronic mail is related to the sender and the receiver of the identified delete program.

11 Claims, 15 Drawing Sheets

FIG. 2

200-1 Date: Thu, 14 Jun 2007 18:27:14 + 0900
200-2 From: aaa@net.co.jp
200-3 Subject: TROUBLE ABOUT A COMPANY
200-4 To: bbb@net.co.jp
200-5 MESSAGE ID: <XXX>
200-6 CONTENT TYPE: Text/plain; charset = iso-2022-jp
200-7 IMPORTANT INFORMATION FLAG: ON
200-8 FORWARDING DISABLE FLAG: OFF
200-9 DELETE FLAG: OFF
200-10 DELETE COMPLETION FLAG: OFF

| MESSAGE ID | XXX |
|---|---|
| SUBJECT | TROUBLE ABOUT A COMPANY |
| FORWARDING MESSAGE ID | YYY |
| SENDER | aaa@net.co.jp |
| FORWARDING DESTINATION | STATUS INFORMATION |
| eee@net.co.jp | ALREADY SENT |
| fff@net.co.jp | ALREADY SENT |

| MESSAGE ID | XXX |
|---|---|
| SUBJECT | TROUBLE ABOUT A COMPANY |
| FORWARDING MESSAGE ID | YYY |
| SENDER | aaa@net.co.jp |
| FORWARDING DESTINATION | STATUS INFORMATION |
| eee@net.co.jp | DELETE HAS BEEN INSTRUCTED |
| fff@net.co.jp | DELETE HAS BEEN INSTRUCTED |

| MESSAGE ID | XXX | |
|---|---|---|
| SUBJECT | TROUBLE ABOUT A COMPANY | |
| FORWARDING MESSAGE ID | YYY | |
| SENDER | aaa@net.co.jp | |
| FORWARDING DESTINATION | | STATUS INFORMATION |
| eee@net.co.jp | | ALREADY DELETED |
| fff@net.co.jp | | ALREADY DELETED |

1000

RECORDING MEDIUM WITH ELECTRONIC MAIL MANAGEMENT PROGRAM RECORDED, COMMUNICATION TERMINAL, AND ELECTRONIC MAIL MANAGEMENT METHOD

CROSS-REFERENCE TO RELATED APPLICATION

This application is based upon and claims the benefit of priority of the prior Japanese Patent Application No. 2008-60986, filed on Mar. 11, 2008 the entire contents of which are incorporated herein by reference.

FIELD

The present invention relates to an electronic mail management program of managing electronic mail, a recording medium having the program recorded, a communication terminal, and an electronic mail management method.

BACKGROUND

Generally, in managing an electronic mail including important information requiring secrecy such as customer information and product information, the mail has been distinguished from the other electronic mails, for example, by attaching an identifier depicting the importance of the electronic mail to the subject.

When a customer gives an instruction to delete the electronic mail including important information, the electronic mail to be deleted is handled according to the identifier attached to the subject and deleted manually. Further, when the electronic mail to be deleted has been sent to another user, the user is ordered to delete the electronic mail.

However, in recent years, the number of electronic mails managed by a user has been increasing and the work load of deleting the delete-ordered electronic mails and instructing a receiver to delete the above has been increasing. As a result, there is a problem when a user forgets to delete the electronic mail or a user forgets to instruct a receiver to delete it.

SUMMARY

According to a recording medium with the electronic mail management program recorded, a communication terminal, and an electronic mail management method, an address set in a forwarding mail of an electronic mail received from a sender is obtained, a receiver of a delete program for deleting the forwarding mail is identified as the obtained destination, and the electronic mail is related to the sender and the identified receiver of the delete program. The object and advantages of the invention will be realized and attained by means of the elements and combinations particularly pointed out in the claims. It is to be understood that both the foregoing general description and the following detailed description are exemplary and explanatory and are not restrictive of the embodiment, as claimed.

BRIEF DESCRIPTION OF DRAWINGS

FIG. 2 is an explanatory diagram depicting a concrete example of header information;

FIG. 3 is an explanatory diagram depicting a concrete example of a management list;

FIG. 8 is an explanatory diagram (No. 1) depicting a concrete example of the modified management list;

FIG. 10 is an explanatory diagram (No. 2) depicting a concrete example of the modified management list;

DESCRIPTION OF EMBODIMENTS

Hereinafter, referring to the attached drawings, an embodiment of the invention will be described in detail.

(System Structure of Electronic Mail Management System)

Figure 1:
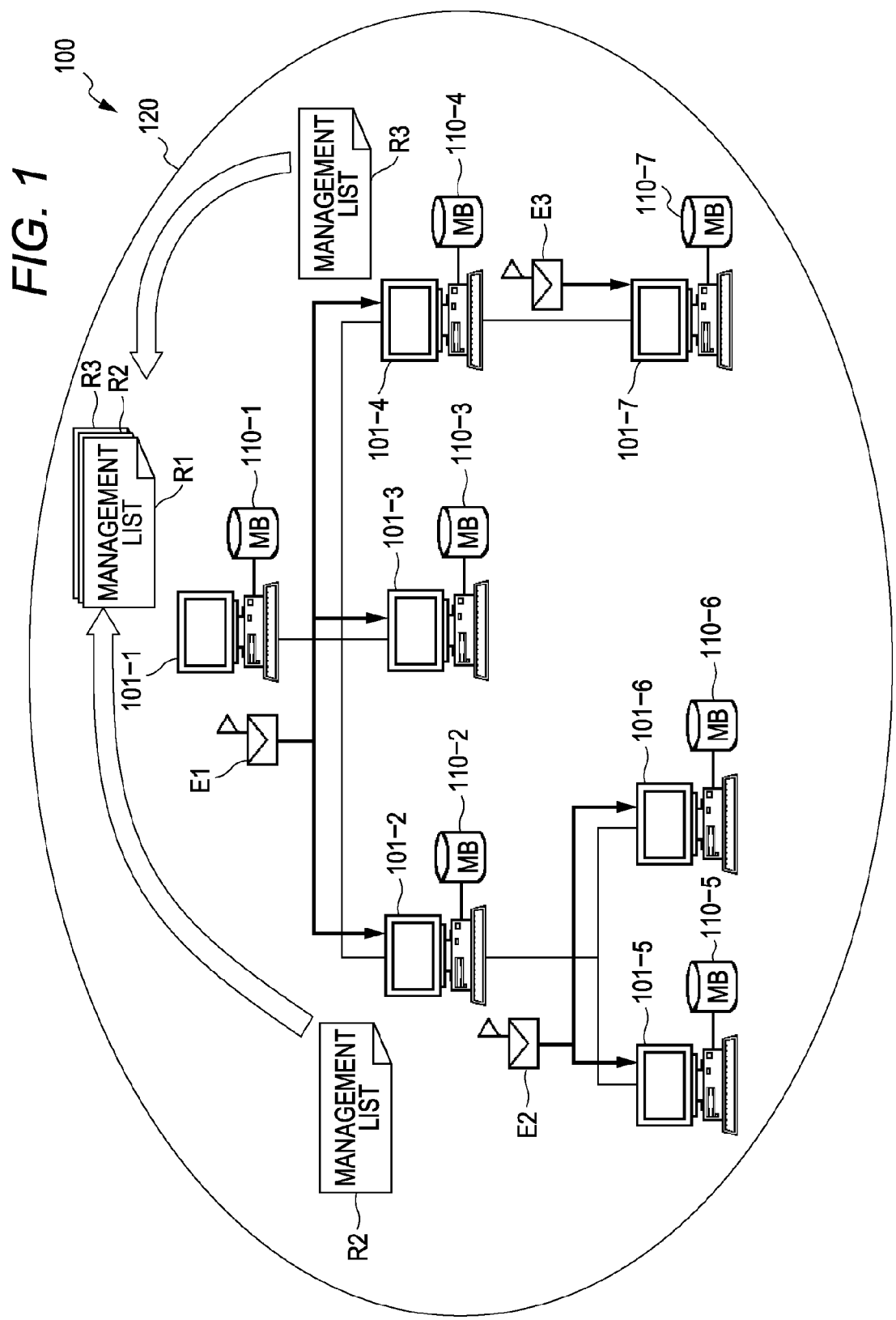
FIG. 1 is a system structure diagram of an electronic mail management system according to an embodiment of the invention.

At first, a system structure of an electronic mail management system according to an embodiment of the invention will be described. FIG. 1 is a system structure diagram of the electronic mail management system according to the embodiment. In FIG. 1, an electronic mail management system 100 includes a plurality of communication terminals 101-1 to 101-7 (seven terminals in FIG. 1) which are connected to each other through a network 120 such as the Internet, LAN (Local Area Network), and WAN (Wide Area Network).

The communication terminals 101-1 to 101-7 are computers each having a function for sending and receiving electronic mails. The communication terminals 101-1 to 101-7 respectively include mail boxes (MB) 110-1 to 110-7 for storing the received and sent electronic mails.

In FIG. 1, an electronic mail E1 with an important information flag set is sent from the communication terminal 101-1 to the communication terminals 101-2 to 101-4. As the result, the electronic mail E1 is stored in a sent box of the mail box 110-1 in the communication terminal 101-1, and the electronic mail E1 is stored in the receiving boxes of the respective mail boxes 110-2 to 110-4 in the respective communication terminals 101-2 to 101-4.

A forwarding mail E2 of the electronic mail E1 is sent from the communication terminal 101-2 to the communication terminals 101-5 and 101-6. As the result, the forwarding mail E2 is stored in the sent box of the mail box 110-2 in the communication terminal 101-2 and the forwarding mail E2 is stored in the receiving boxes of the respective mail boxes 110-5 and 110-6 in the respective communication terminals 101-5 and 101-6.

Further, a forwarding mail E3 of the electronic mail E1 is sent from the communication terminal 101-4 to the communication terminal 101-7. Then, the forwarding mail E3 is stored in the sent box of the mail box 110-4 in the communication terminal 101-4 and it is also stored in the receiving box of the mail box 110-7 in the communication terminal 101-7.

Here, the header information of the electronic mail E1 and the forwarding mails E2 and E3 includes a message ID and/or a forwarding message ID for identifying the electronic mail E1 and the forwarding mails E2 and E3. For example, at a time of sending the electronic mail E1, an inherent message ID based on the transmission protocol is automatically attached to the header information of the electronic mail E1.

At a time of sending the forwarding mails E2 and E3, in other words, at a time of forwarding the electronic mail E1, an inherent forwarding message ID based on the transmission protocol is automatically attached to the header information of the forwarding mails E2 and E3. And the header information of the forwarding mails E2 and E3 also includes the message ID of the electronic mail E1 that is the original mail.

Further, an attribute flag for the electronic mails E1 to E3 can be set in the header information. The attribute flag means, for example, an important information flag depicting that the mail includes important information requiring secrecy such as customer information and product information and a forwarding disable flag depicting that it is not to be forwarded. Here, at a time of sending the electronic mail E1, a user can set the important information flag and the forwarding disable flag optionally.

Each of the communication terminals 101-1 to 101-7 has a function of creating a management list indicating status information of an electronic mail, its sender, and its forwarding destination, which are related to each other. The management list is to specify, for example, a sender, receiver, and forwarding destination of an electronic mail including important information.

More specifically, for example, the management lists (R1 to R3 in FIG. 1) are created in a sender (communication terminal 101-1) and a receiver (communication terminals 101-2 to 101-4) of the electronic mail E1. Further, when some change occurs in the management lists R2 and R3 created in the receivers, the changed management lists R2 and R3 are sent from the receivers to the sender.

Transmission and reception of electronic mails (the electronic mail E1 and the forwarding mails E2 and E3) between the communication terminals from 101-1 to 101-7 may be realized, for example, by the direct communication between the terminals and may be realized through a mail server (not depicted) provided by the Internet service provider.

When the electronic mail E1 and the forwarding mails E2 and E3 with the important information flags set there are stored in the mail boxes 110-1 to 110-7, each of them may be stored in an access-controlled important information receiving box or an access-controlled important information sent box, from the viewpoint of security. This prevents a non-accessible user from reading a mail, hence to ensure the security of an electronic mail including important information.

(Concrete Example of Header Information)

The header information of an electronic mail will be described. FIG. 2 is an explanatory diagram depicting a concrete example of the header information. FIG. 2 depicts header information 200 of the electronic mail E1 (refer to FIG. 1) sent from the communication terminal 101-1 to the communication terminal 101-2. This figure depicts one portion extracted from the header information.

In the header information 200, a reference numeral 200-1 designates the sent date and time of the electronic mail E1. A reference numeral 200-2 designates the address of a sender of the electronic mail E1. A reference numeral 200-3 designates a subject of the electronic mail E1. A reference numeral 200-4 designates the address of a receiver of the electronic mail E1. A reference numeral 200-5 designates the inherent message ID for identifying the electronic mail E1. A reference numeral 200-6 designates a content type depicting a file format of the electronic mail E1.

A reference numeral 200-7 designates an important information flag depicting whether the electronic mail E1 includes some important information. A reference numeral 200-8 designates a forwarding disable flag depicting that the electronic mail E1 is prohibited to be forwarded. A reference numeral 200-9 designates a delete flag depicting a delete instruction for the electronic mail E1. A reference numeral 200-10 designates a deletion completion flag depicting that the electronic mail E1 has been deleted.

Among the attribute flags 200-7 to 200-10, only the important information flag 200-7 is set at "ON" and the forwarding disable flag 200-8, the delete flag 200-9, and the deletion completion flag 200-10 are set at "OFF". This depicts that the electronic mail E1, including the important information, can be forwarded.

In addition, the header information of the respective forwarding mails E2 and E3 of the electronic mail E1 includes the respective inherent forwarding message IDs (for example, YYY and ZZZ) for identifying the respective forwarding mails E2 and E3 and the message ID "XXX" of the electronic mail E1.

(Concrete Example of Management List)

Referring to the communication terminal 101-2 depicted in FIG. 1 as an example, the management list R2 will be described. FIG. 3 is an explanatory diagram depicting the concrete example of the management list. In FIG. 3, the management list R2 depicts the status information of the forwarding mail E2, the communication terminal 101-1 of the sender, and the communication terminals 101-5 and 101-6 of the forwarding destinations, which are related to each other.

Specifically, the management list R2 has the message ID of the electronic mail E1 that is the original mail, the subject of the electronic mail E1, the forwarding message ID of the forwarding mail E2, the address of the communication terminal 101-1 that is the sender, the addresses of the communication terminals 101-5 and 101-6 of the forwarding destinations, and the status information. The status information depicts that the forwarding mail E2 has been sent (In FIG. 3, a dotted line frame 300).

(Hardware Structure of Communication Terminal)

Figure 4:
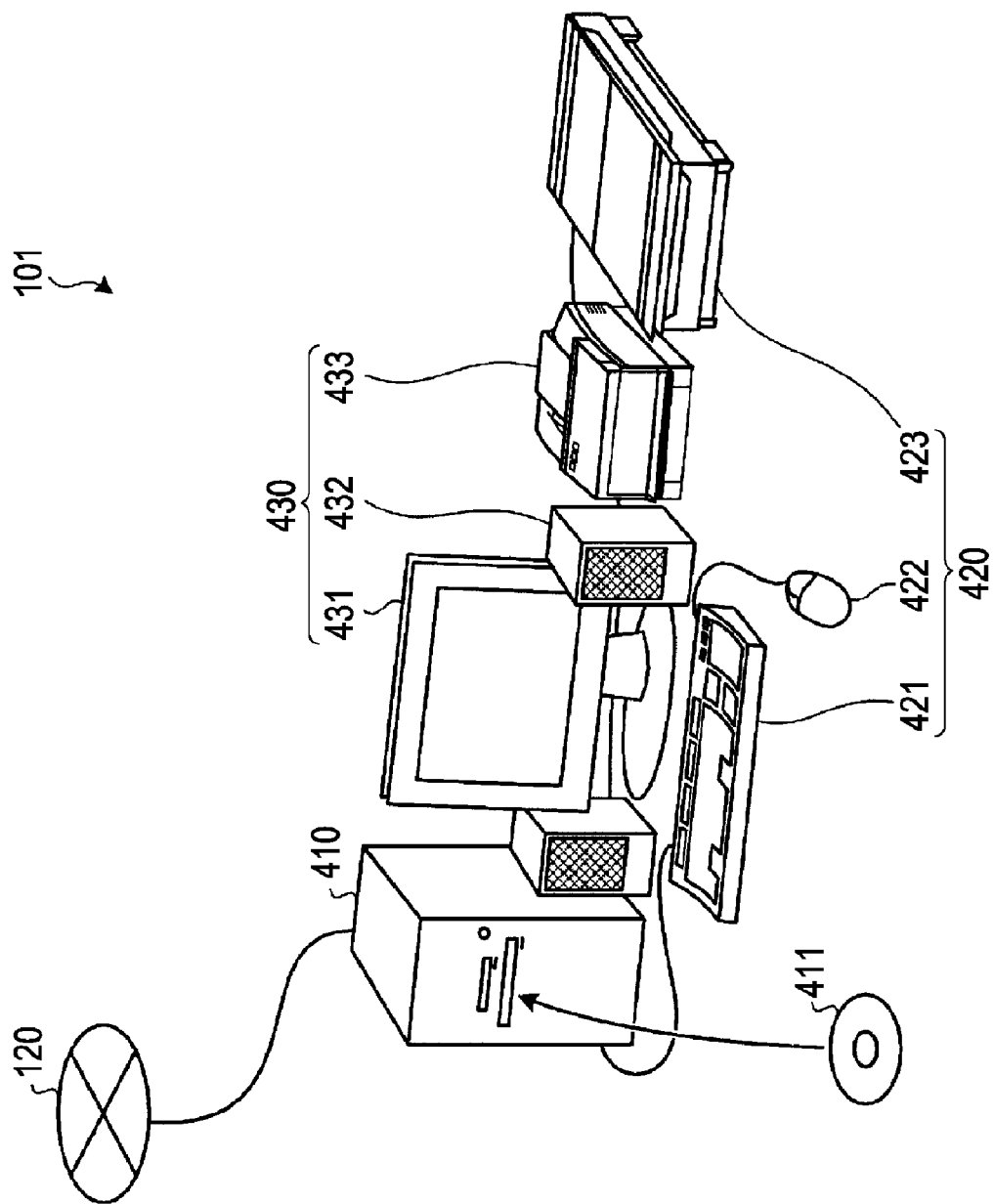
FIG. 4 is an explanatory diagram depicting a hardware structure of a communication terminal according to the embodiment.

Next, the hardware structure of the communication terminals 101-1 to 101-7 (hereinafter, referred to as "communication terminal 101" simply) according to the embodiment will be described. FIG. 4 is an explanatory diagram depicting the hardware structure of the communication terminal according to the embodiment.

In FIG. 4, the communication terminal 101 is formed by a computer 410, an input device 420, and an output device 430, and it may be connected to a network 120 such as LAN, WAN, and the Internet through a router and a modem not depicted.

The computer 410 has a CPU, a memory, and an interface. The CPU controls the whole operation of the communication terminal 101. The memory includes a ROM, a RAM, an HD, an optical disk 411, and a flash memory. The memory is used as a work area of the CPU.

Various programs are stored in the memory and loaded according to an instruction from the CPU. In the HD and the optical disk 411, reading and writing of the data is controlled through a disk drive. The optical disk 411 and the flash memory are detachable from the computer 410. The interface controls input from the input device 420, output to the output device 430, and transmission and reception through the network 120.

As the input device 420, there are a keyboard 421, a mouse 422, and a scanner 423. The keyboard 421 has keys for entering letters, numbers, and various instructions, in order to input date. It may be a touch panel type. The mouse 422 moves a cursor, selects a range, moves a window, and changes window size. The scanner 423 reads an image optically. The read image is captured as image data and stored in the memory within the computer 410. The scanner 423 may have an OCR function.

As the output device 430, there are a display 431, a speaker 432, and a printer 433. The display 431 displays the data of a document, image, and function information as well as cursor, icon, and tool box. The speaker 432 outputs sound such as sound effects and reading out voice. The printer 433 prints the image data and the document data.

(Functional Structure of Communication Terminal)

Figure 5:
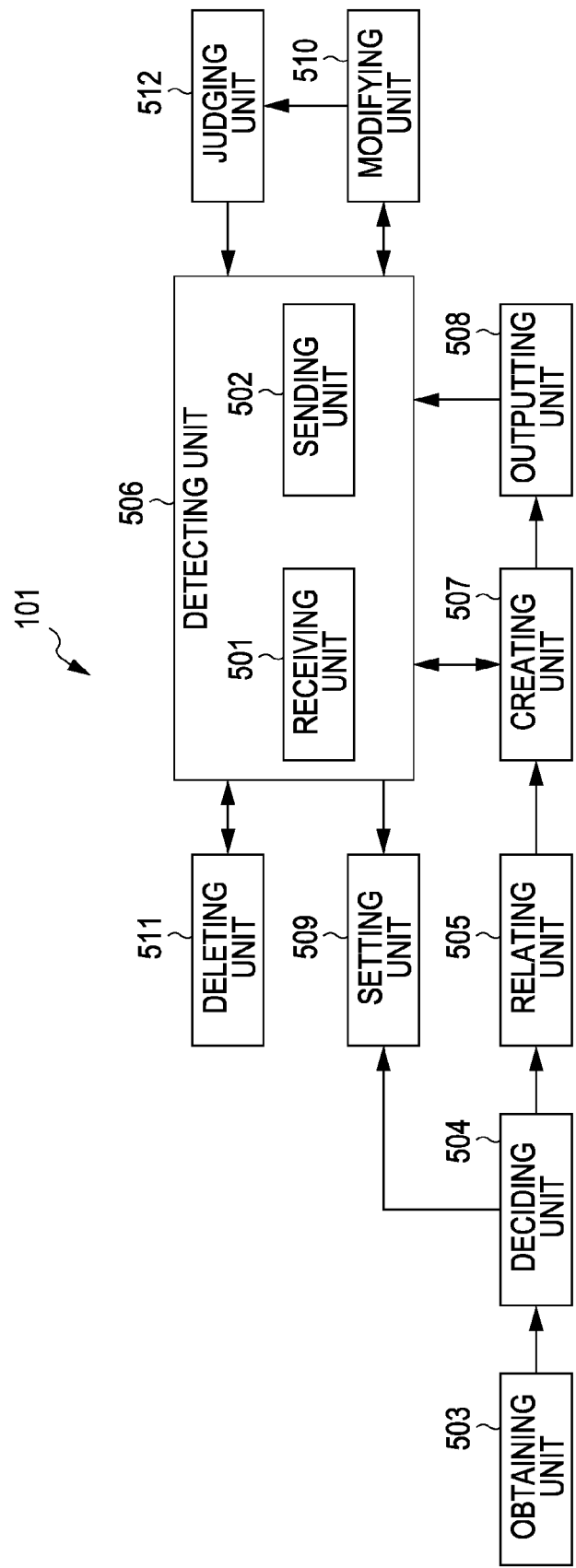
FIG. 5 is a block diagram depicting a functional structure of the communication terminal.

Next, the functional structure of the communication terminal 101 will be described. FIG. 5 is a block diagram depicting the functional structure of the communication terminal. In FIG. 5, the communication terminal 101 includes a receiving unit 501, a sending unit 502, an obtaining unit 503, a deciding unit 504, a relating unit 505, a detecting unit 506, a creating unit 507, an outputting unit 508, a setting unit 509, a modifying unit 510, a deleting unit 511, and a judging unit 512.

These functions 501 to 512 can be realized by the CPU executing the programs corresponding to the functions 501 to 512 stored in the storing unit of the communication terminal 101, or through an input/output I/F. The output data from the respective functions 501 to 512 is stored in the storing unit. Here, assume that each function in the connected party as indicated by each arrow in FIG. 5 can be realized by the CPU executing the program for the corresponding function after reading the output data from each function in the connecting party, from the storing unit.

At first, the receiving unit 501 has a function of receiving electronic mails. The sending unit 502 has a function of sending electronic mails. Header information (for example, the header information 200) is attached to an electronic mail. An attribute flag of an electronic mail included in the header information may be set optionally, for example, at a time of sending the electronic mail.

Figure 6:
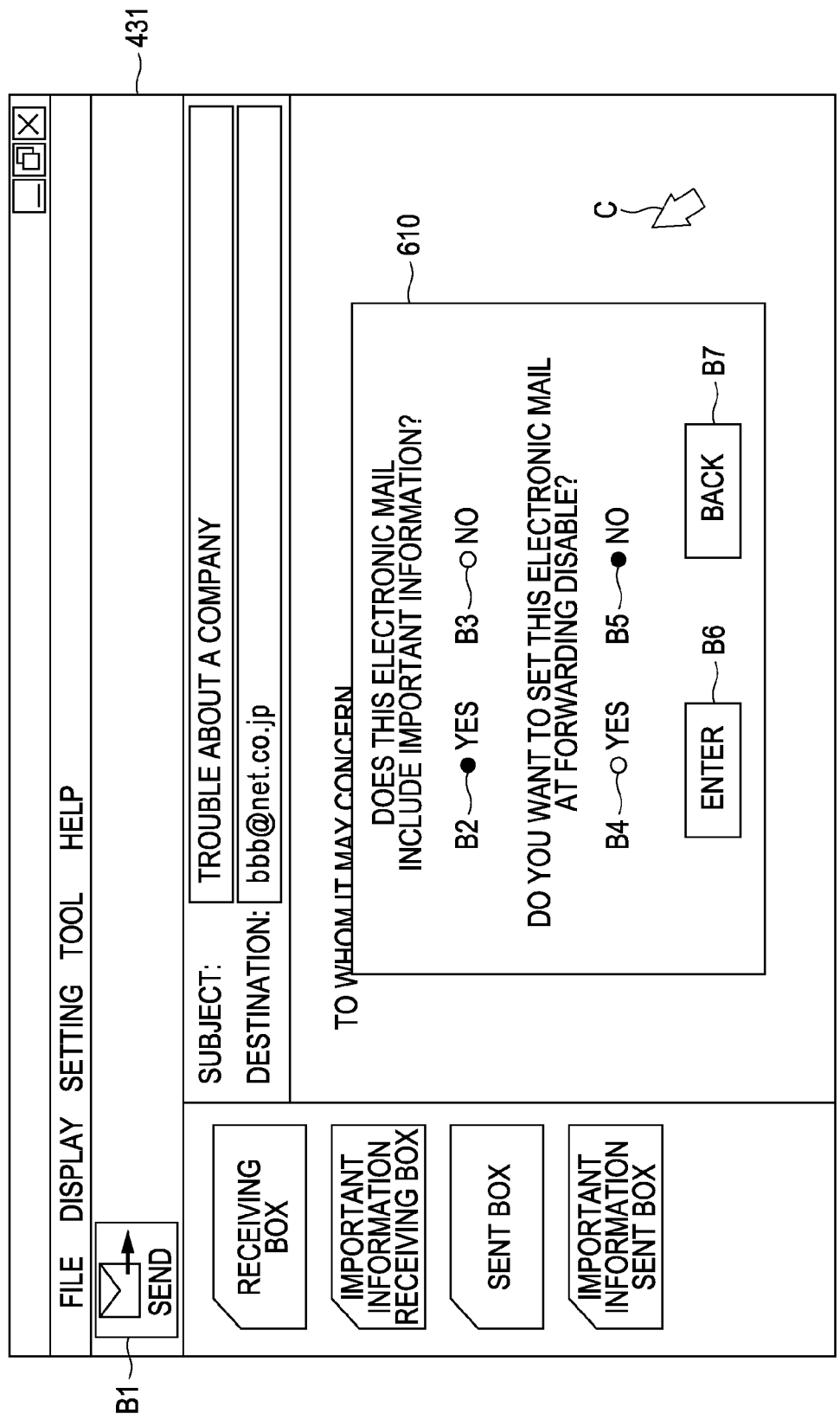
FIG. 6 is an explanatory diagram depicting an example of a setting screen of an attribute flag.

An example of a setting screen of the attribute flag will be described, which is to be displayed on the display 431 at a time of sending an electronic mail. FIG. 6 is an explanatory diagram depicting one example of the setting screen of the attribute flag. In FIG. 6, a setting screen 600 for setting the attribute flag of an electronic mail is displayed on the display 431.

In the screen 600, when a user moves the cursor C and clicks a send button B1 while operating the input device 420 such as the keyboard 421 and the mouse 422 depicted in FIG. 4, a dialogue box 610 is displayed. Then, when a user moves the cursor C and clicks a flag button B2, he or she can set an important information flag. When a user clicks a flag button B3, the important information flag is not set in a mail.

When a user moves the cursor C and clicks a flag button B4, he or she can set a forwarding disable flag. When a user clicks a flag button B5, the forwarding disable flag is not set. As the result, for example, as depicted in FIG. 2, an important information flag 200-7 is turned "ON" and the forwarding disable flag 200-8 is turned "OFF" in the header information 200.

When a user moves the cursor C and clicks an enter button B6, an electronic mail with the header information reflecting the setting is sent to a destination. When a user clicks a back button B7, it returns into the previous screen before the dialogue box 610 is displayed.

In case of sending an electronic mail including important information, an important information flag is set in this way, thereby automatically enabling a destination party to recognize that this electronic mail includes the important information, according to the header information.

The attribute flag of an electronic mail may be set only at a time of sending the original mail. In other words, at a time of sending the forwarding mail, the dialogue box 610 is not displayed. This can prevent fraudulent change of the attribute flag at a time of forwarding the electronic mail.

The obtaining unit 503 has a function of obtaining an address set in a forwarding mail. The address is, for example, an electronic mail address of the forwarding mail. Specifically, the obtaining unit 503 obtains the address set in a forwarding mail, for example, through a user's operation of the input device 420 such as the keyboard 421 and the mouse 422 when creating the forwarding mail.

Taking the communication terminal 101-2 depicted in FIG. 1 as an example, the obtaining unit 503 obtains the addresses of the communication terminals 101-5 and 101-6 set in the forwarding mail E2. More specifically, for example, the obtaining unit 503 may obtain the address from the forwarding mail, or from an address book.

The address book includes the address of a receiver and the name, company name, and department name of a user corresponding to the address. The address book is created previously by a user for every receiver and stored in the communication terminal 101 as a database.

The timing of obtaining address by the obtaining unit 503 may be, for example, at a time of entering an instruction to send a forwarding mail, or at a time of storing a forwarding mail in the sent box of the mail boxes 110-1 to 110-7 (hereinafter, simply represented as "mail box 110").

The deciding unit 504 has a function of identifying the address detected by the detecting unit 506 as the receiver of a delete program for deleting the forwarding mail. Namely, assuming that there will be a delete instruction of the electronic mail in the future, the receiver of the delete program for deleting the forwarding mail of the electronic mail is previously determined.

Taking the communication terminal 101-2 depicted in FIG. 1 as an example, the deciding unit 504 decides the communication terminals 101-5 and 101-6 of the addresses obtained by the obtaining unit 503 as the receivers of the delete program for deleting the forwarding mail E2.

The relating unit 505 has a function of relating an electronic mail received by the receiving unit 501 to the sender of the electronic mail and the receiver of the delete program decided by the deciding unit 504. More specifically, the relating unit 505 relates the message ID of the electronic mail to the sender address and the receiver address of the delete program, according to the header information of the electronic mail.

The detecting unit 506 has a function of detecting transmission of a forwarding mail. More specifically, for example, the detecting unit 506 may detect the transmission of a forwarding mail when detecting the transmission control of the forwarding mail to the network 120 by the output I/F. In addition, the detecting unit 506 may detect the transmission of the forwarding mail when an electronic mail with the header information including the forwarding message ID attached thereto is detected from the sent box of the mail box 110.

The creating unit 507 has a function of creating a management list which depicts the status information indicating whether a forwarding mail has been sent, a sender, and a receiver of the delete program, which are related to each other, based on the result obtained by the relating unit 505 when the detecting unit 506 detects the transmission of a forwarding mail.

Taking the communication terminal 101-2 depicted in FIG. 1 as an example, based on the result from the relating unit 505, the creating unit 507 creates the management list R2 (refer to FIG. 3) depicting the status information indicating whether the forwarding mail has been sent, the communication terminal 101-1 that is the sender, and the communication terminals 101-5 and 101-6 that are the receivers of the delete program, which are related to each other.

The outputting unit 508 has a function of outputting the management list created by the creating unit 507. The output format from the outputting unit 508 may be any of a screen display on the display 431, printout by the printer 433, data output (store) into the memory, and transmission to the sender of the electronic mail by the sending unit 502.

A user can grasp the sender and the forwarding destination in every forwarded electronic mail, referring to the management list output from the outputting unit 508. Further, the management list is sent to the sender of the electronic mail, thereby making it possible to inform the forwarding state of the electronic mail to the user that is the sender.

The setting unit 509 has a function of setting the receiver of the delete instruction mail about the instruction to delete the forwarding mail with the delete program attached, as the receiver of the delete program decided by the deciding unit 504. For example, the delete instruction mail is for requesting the receiver to delete the electronic mail, from the viewpoint of protection against leakage and fraudulent use of the important information.

The sending unit 502 has a function of sending a delete instruction mail of a forwarding mail. The header information of the delete instruction mail of the forwarding mail includes, for example, a forwarding message ID for identifying a mail to be deleted.

The detecting unit 506 has a function of detecting the receipt of a delete instruction mail about the instruction to delete an electronic mail, which instruction mail is sent from a sender. Specifically, for example, when the receiving unit 501 receives the electronic mail including the header information with the delete flag set there, the detecting unit 506 detects the receipt of the delete instruction mail of the electronic mail specified from the message ID included in the header information.

When the detecting unit 506 detects the receipt of the delete instruction mail of the electronic mail, the setting unit 509 sets the receiver of the delete instruction mail of the forwarding mail at the receiver decided by the deciding unit 504. The sending unit 502 sends the delete instruction mail of the forwarding mail to the receiver set by the setting unit 509.

For example, at first, the obtaining unit 503 obtains the message ID included in the header information of the delete instruction mail of the electronic mail. Then, based on the result obtained by the relating unit 505 or the management list created by the creating unit 507, the forwarding status of the electronic mail specified according to the obtained message ID is judged.

When the electronic mail has been already forwarded, the setting unit 509 sets the receiver of the delete instruction mail of the forwarding mail at the receiver decided by the deciding unit 504. The sending unit 502 sends the delete instruction mail with the header information including the forwarding message ID of the forwarding mail attached there, to the receiver set by the setting unit 509.

Taking the communication terminal 101-2 depicted in FIG. 1 as an example, the setting unit 509 specifies the electronic mail E1 according to the header information of the delete instruction mail from the communication terminal 101-1 and sets the receiver of the delete instruction mail of the forwarding mail E2 of the electronic mail E1 at the communication terminals 101-5 and 101-6.

For example, the delete program for deleting an electronic mail is attached to the delete instruction mail of the electronic mail sent from the sender. The delete program for deleting the forwarding mail may be obtained from the delete instruction mail of the electronic mail. At this time, the delete program for deleting the electronic mail may be used for the delete program for deleting the forwarding mail.

The timing when the sending unit 502 sends the delete instruction mail of the forwarding mail may be at the time when the setting unit 509 sets the receiver. After the setting unit 509 sets the receiver into a state of waiting for input of an instruction to send the delete instruction mail, a message to the effect that the delete instruction mail is sent may be depicted on the display 431.

Figure 7:
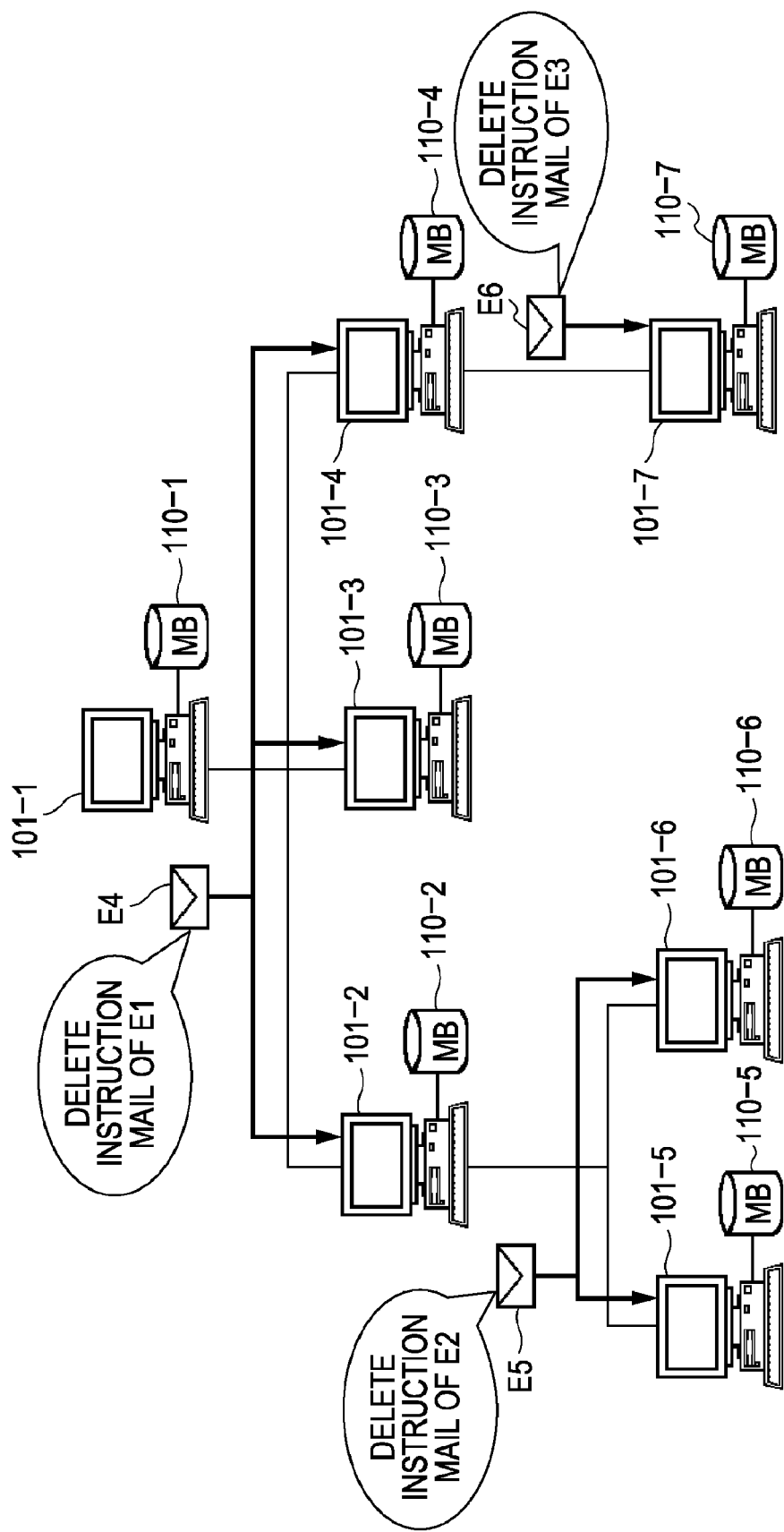
FIG. 7 is an explanatory diagram depicting the outline of the sending process of a delete instruction mail.

The outline of the process for sending the delete instruction mail will be described. FIG. 7 is an explanatory diagram depicting the outline of the process for sending the delete instruction mail. In FIG. 7, at first, a delete instruction mail E4 of the electronic mail E1 is sent from the communication terminal 101-1 to the communication terminals 101-2 to 101-4.

Then, when the communication terminal 101-2 receives the delete instruction mail E4, it sends a delete instruction mail E5 of the forwarding mail E2 to the communication terminals 101-5 and 101-6. When the communication terminal 101-4 receives the delete instruction mail E4, the communication terminal 101-4 sends a delete instruction mail E6 of the forwarding mail E3 to the communication terminal 101-7.

In this way, when the delete instruction mail E4 of the electronic mail E1 is sent from the sender of the electronic mail E1 to the receivers, the respective delete instruction mails E5 and E6 of the respective forwarding mails E2 and E3 are automatically sent from the respective receivers to the respective forwarding destinations of the electronic mail E1. This can prevent failing to issue the delete instructions of the forwarding mails E2 and E3 when there is the delete instruction of the electronic mail E1.

The detecting unit 506 has a function of detecting the transmission of a delete instruction mail of an electronic mail or a forwarding mail. Specifically, when detecting a transmission control of an electronic mail having the head information with the delete flag set there, on the network 120 through the output I/F, the detecting unit 506 detects the transmission of a delete instruction mail of an electronic mail or a forwarding mail specified from the message ID or forwarding message ID included in the header information.

The modifying unit 510 has a function of modifying the status information of the management list created by the creating unit 507. Specifically, for example, when the detecting unit 506 detects the transmission of a delete instruction mail, the modifying unit 510 may modify the status information of the management list to the state in which the delete instruction mail has been sent.

Taking the management list R2 depicted in FIG. 3 as an example, the management list R2 modified by the modifying unit 510 will be described. FIG. 8 is an explanatory diagram (No. 1) depicting the concrete example of the modified management list. FIG. 8 depicts the management list R2 in which the status information was modified by the modifying unit 510.

Specifically, as the result of the communication terminal 101-2 sending the delete instruction mail E5 of the forwarding mail E2 to the communication terminals 101-5 and 101-6, the modifying unit 510 modifies the status information of the management list R2 depicted in FIG. 3 from the state in which the forwarding mail has been sent to the state in which the forwarding mail deletion has been instructed (in FIG. 8, dotted line frame 800). In this way, in the communication terminal 101-2, it is possible to grasp the sending status of the delete instruction mail of the forwarding mails E2 and E3, with reference to the modified management list R2.

The sending unit 502 has a function of sending the modified management list to the sender when the modifying unit 510 modifies the status information. Taking the communication terminal 101-2 depicted in FIG. 1 as an example, as the result of modification of the status information in the management list R2 depicted in FIG. 3, the sending unit 502 sends the management list R2 depicted in FIG. 8 to the communication terminal 101-1. Thus, in the communication terminal 101-1, it is possible to grasp the sending status of the delete instruction mail of the forwarding mails E2 and E3, with reference to the management list R2.

When the detecting unit 506 detects the receipt of a delete instruction mail of an electronic mail, the deleting unit 511 has a function of deleting the electronic mail by executing the delete program attached to the delete instruction mail of the same electronic mail.

Specifically, a target mail to be deleted is detected from the mail box 110 (receiving box and sent box), for example, by using the message ID included in the header information of the delete instruction mail of the electronic mail. Then, the detected electronic mail is deleted by executing the delete program.

Since the deleting process of an electronic mail using the delete program is well known, the detailed explanation is omitted here. When any target mail to be deleted is not detected from the mail box 110, it may be judged that a user has deleted the target mail to be deleted manually.

When the deleting unit 511 deletes an electronic mail, the sending unit 502 has a function of sending a delete completion mail depicting that the electronic mail has been deleted to the sender. For example, the delete completion mail includes the message ID of the deleted electronic mail.

Figure 9:
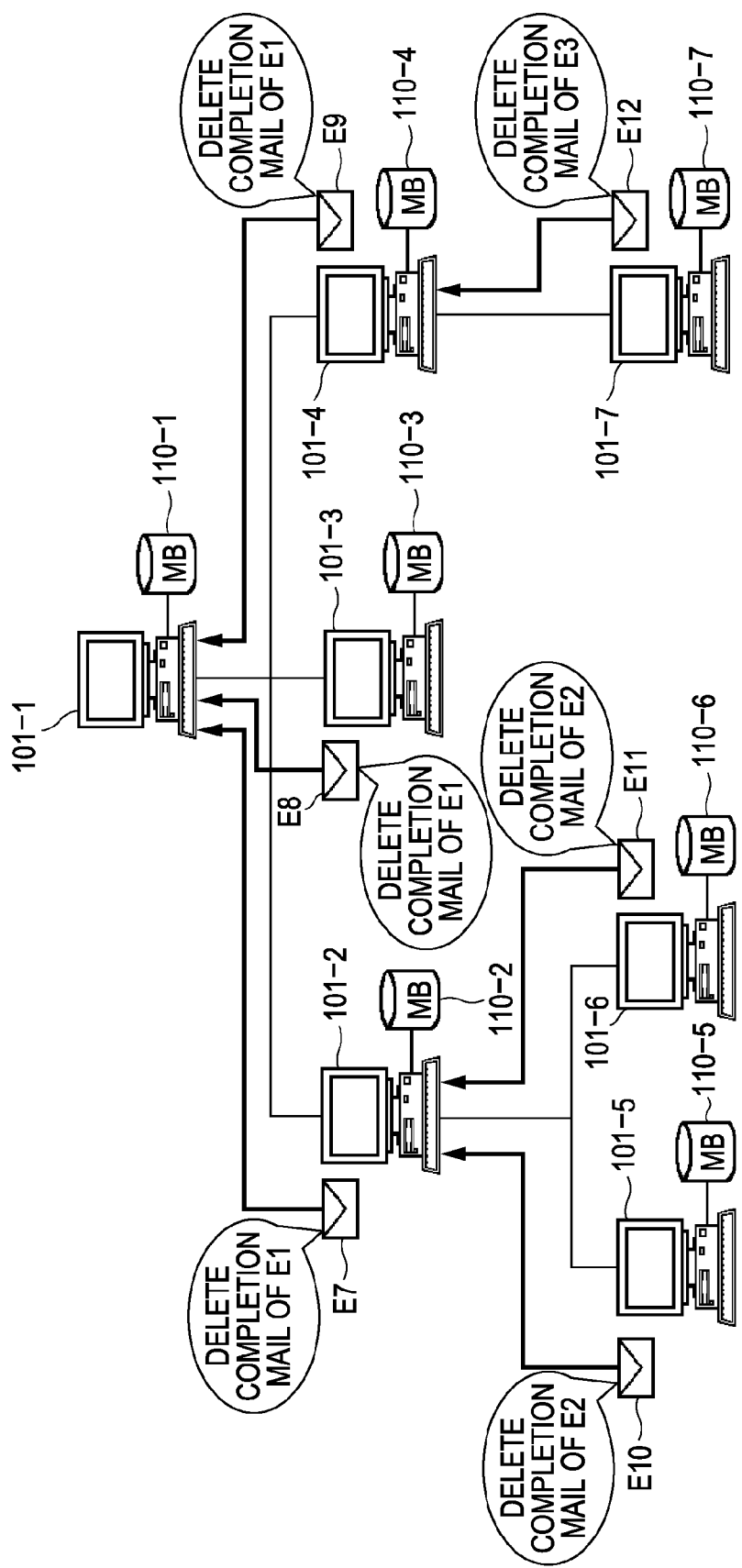
FIG. 9 is an explanatory diagram depicting the outline of the sending process of a delete completion mail.

The outline of the sending process of the delete completion mail will be described. FIG. 9 is an explanatory diagram depicting the outline of the sending process of the delete completion mail. In FIG. 9, when the electronic mail E1 is deleted in the communication terminals 101-2 to 101-4, the delete completion mails E7 to E9 of the electronic mail E1 are sent to the communication terminal 101-1.

In addition, when the forwarding mail E2 is deleted in the communication terminals 101-5 and 101-6, the delete completion mails E10 and E11 of the forwarding mail E2 are sent to the communication terminal 101-2. Further, when the forwarding mail E3 is deleted in the communication terminal 101-7, the delete completion mail E12 of the forwarding mail E3 is sent to the communication terminal 101-4.

In this way, when the target mail to be deleted has been deleted, the delete completion mail to that effect is sent to the sender of the above mail. According to this, the sender of the electronic mail can grasp that the same mail has been deleted in the receivers.

The detecting unit 506 has a function of detecting the receipt of a delete completion mail depicting that the forwarding mail has been deleted, which is sent from the receiver of the delete program. Specifically, for example, when the receiving unit 501 receives the electronic mail including the header information with the deletion completion flag set there, the detecting unit 506 detects the receipt of the delete completion mail of the forwarding mail specified from the forwarding message ID included in the header information.

The modifying unit 510 has a function of modifying the status information to the state in which the forwarding mail has been deleted when the detecting unit 506 detects the receipt of the delete completion mail. Specifically, for example, the modifying unit 510 modifies the status information of the forwarding mail specified from the forwarding message ID included in the header information of the delete completion mail to the state in which the forwarding mail has been deleted.

Taking the management list R2 depicted in FIG. 8 as an example, the modified management list R2 modified by the modifying unit 510 will be described. FIG. 10 is an explanatory diagram (No. 2) depicting the concrete example of the modified management list. FIG. 10 depicts the management list R2 with the status information modified by the modifying unit 510.

Specifically, as a result of the communication terminal 101-2 receiving the delete completion mails E10 and E11 of the forwarding mail E2 from the communication terminals 101-5 and 101-6, the modifying unit 510 modifies the status information of the management list R2 depicted in FIG. 8 from the state in which the deletion of the forwarding mail has been instructed to the state in which the forwarding mail has been deleted (in FIG. 10, dotted line frame 1000). Thus, in the communication terminal 101-2, it is possible to grasp the situation about the deletion of the forwarding mails E2 and E3, with reference to the modified management list R2.

The judging unit 512 has a function of judging whether or not all the status information in the management list has been modified to the state in which the forwarding mail has been deleted, according to the result of the modification by the modifying unit 510. In other words, it judges whether or not the delete completion mail depicting the deletion completion of the forwarding mail has been received from all the forwarding destinations.

Taking the management list R2 depicted in FIG. 10 as an example, through receiving the delete completion mails E10 and E11 of the forwarding mail E2 from the communication terminals 101-5 and 101-6, the judging unit 512 judges whether or not all the status information of the management list R2 depicted in FIG. 8 has been modified from the state in which the deletion of the forwarding mail has been instructed to the state in which the forwarding mail has been deleted.

When the judging unit 512 judges that all the status information has been modified, the sending unit 502 may send the modified management list in which the status information has been modified to the sender. Namely, the management list is not sent to the sender every time the status information is modified, but after the forwarding mails are deleted in all the forwarding destinations.

The judging unit 512 has a function of judging whether or not an electronic mail is a target candidate to be deleted, according to the header information of the electronic mail. The target candidate to be deleted is, for example, an electronic mail including important information. Specifically, for example, the judging unit 512 checks whether or not the important information flag is set in the header information and when the important information flag is set, the judging unit 512 judges that the mail is the target candidate to be deleted.

When the judging unit 512 judges that an electronic mail is the target candidate to be deleted, the obtaining unit 503 may obtain the address set in the forwarding mail. In this way, only the electronic mail including the important information, of the electronic mails received by the receiving unit 501, is regarded as a management target, hence to reduce the process load in the management of the electronic mails.

The judging unit 512 may judge whether or not a mail is a target candidate to be deleted, for example, from a letter string included in the subject of the electronic mail. More specifically, for example, when a letter string such as "important", "secret", or "customer" is detected from the subject, it judges that the mail is the target candidate to be deleted. This can reduce the operation of setting the important information flag and prevent the failure in the management of the electronic mails caused by a setting miss of the important information flag.

The judging unit 512 may judge whether or not an electronic mail can be forwarded, according to the header information of the electronic mail. Specifically, for example, the judging unit 512 checks whether or not the forwarding disable flag is set in the header information; when the forwarding disable flag is set there, the judging unit 512 judges that the mail cannot be forwarded.

When the judging unit 512 judges that the electronic mail cannot be forwarded, the forwarding of the electronic mail may be prohibited in the communication terminal 101. Specifically, for example, a forwarding button operated at the time of a start of creating a forwarding mail may be disabled, or the transmission of the electronic mail including the message ID within the header information may be disabled.

In the above description, as the result of sending the forwarding mail, when the electronic mail to the effect that the forwarding mail delivery failed is received, for example, the modifying unit 510 may modify the status information from the state in which the forwarding mail has been sent to the state in which the forwarding mail delivery failed. This is helpful in the situation in which the delete instruction mail of the forwarding mail failed in delivery to the forwarding destination.

Figure 11:
FIG. 11 is an explanatory diagram depicting an example of an output screen of the management list.

An example of the output screen of the management list R1 displayed on the display 431 of the communication terminal 101-1 depicted in FIG. 1 will be described. FIG. 11 is an explanatory diagram depicting an example of the output screen of the management list. In FIG. 11, an output screen 1100 of the management list R1 is displayed on the display 431.

In the output screen 1100, when a user moves the cursor C to a display button B8 and clicks a management list display button (not depicted), a dialogue box 1110 appears. The dialogue box 1110 includes the list contents of the management list R1.

Specifically, the dialogue box 1110 depicts the receiver of the electronic mail E1, the status information of the electronic mail E1, and the management list. A user is informed of the deletion status of the electronic mail E1 in the receivers, by referring to the display contents in the dialogue box 1110.

When a user moves the cursor C to a management list button B9 or B10 and clicks it, the display contents of the dialogue box 1110 can be switched to the management list R2 or R3. Thus, a user may grasp the deletion status of the forwarding mails E2 and E3 of the electronic mail E1. When a user moves the cursor C to a back button B11 and clicks it, the screen returns to the list screen, which depicts the sent electronic mails.

(Electronic Mail Management Procedure of Communication Terminal)

Next, an electronic mail management procedure of the communication terminal 101 according to the embodiment will be described.

(Sending Procedure)

Figure 12:
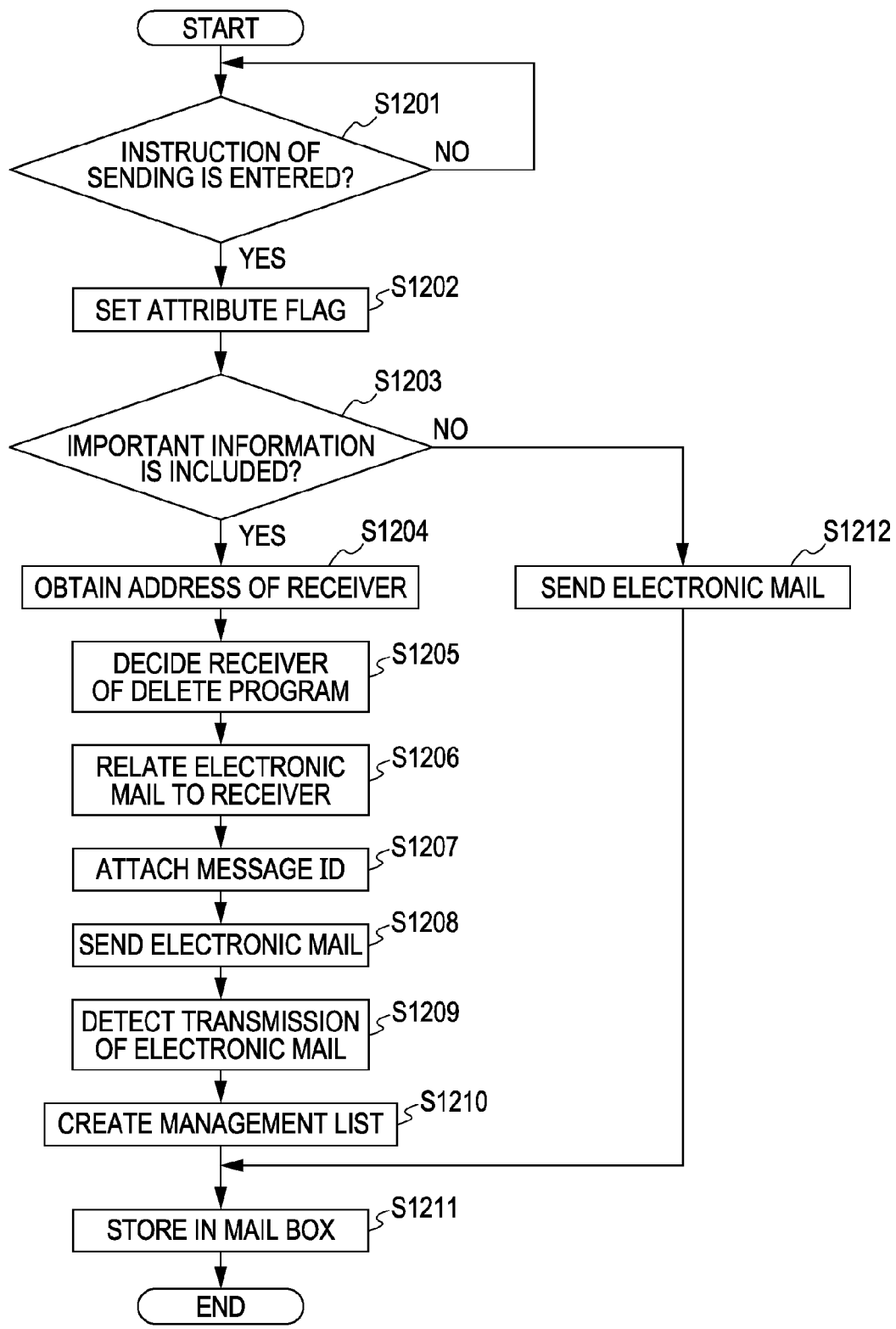
FIG. 12 is a flow chart depicting an example of a sending procedure in the communication terminal.

At first, the sending procedure in the communication terminal 101 will be described. FIG. 12 is a flow chart depicting an example of the sending procedure in the communication terminal. In the flow chart of FIG. 12, it is judged at first whether the instruction of sending an electronic mail has been entered or not (Step S1201).

Input of the instruction of sending an electronic mail is monitored (Step S1201: No) and when the instruction is inputted (Step S1201: Yes), the setting screen 600 is displayed on the display 431, and an attribute flag of the electronic mail is set in the header information, according to a user's input operation (Step S1202).

Then, the judging unit 512 checks whether important information is included in the electronic mail or not, according to the attribute flag set in the header information (Step S1203). When the mail includes the important information (Step S1203: Yes), the obtaining unit 503 obtains the address of a receiver set in the electronic mail (Step S1204).

Then, the deciding unit 504 identifies the address obtained in Step S1204 as the receiver of the delete program for deleting the electronic mail (Step S1205). Next, the relating unit 505 relates the electronic mail to the receiver of the delete program found in Step S1205 (Step S1206). The sending unit 502 sends the electronic mail to the receiver (Step S1208) with the message ID attached to the header information of the electronic mail (Step S1207).

The detecting unit 506 detects the transmission of the electronic mail (Step S1209), and the creating unit 507 creates a management list depicting the status information for indicating whether the electronic mail has been sent and the receiver of the delete program, which are related to each other, according to the result obtained in Step S1206 (Step S1210).

At last, the electronic mail sent in Step S1208 is stored in the mail box 110 (Step S1211), and the process according to the flow chart is completed. Here, the sent electronic mail may be stored in the access-controlled sent box.

In Step S1203, when the important information is not included in the mail (Step S1203: No), the sending unit 502 sends the electronic mail (Step S1212) and stores the sent electronic mail in the mail box 110 (Step S1211), and the process according to the flow chart is completed.

As mentioned above, by relating the electronic mail including the important information to the receiver of the delete program for deleting the electronic mail, the receiver of the delete instruction mail of the electronic mail may be automatically specified upon receipt of the delete instruction of the electronic mail. In addition, by setting the attribute flag in the header information, the receiver can recognize the attribute of the electronic mail automatically.

(Forwarding Procedure)

Figure 13:
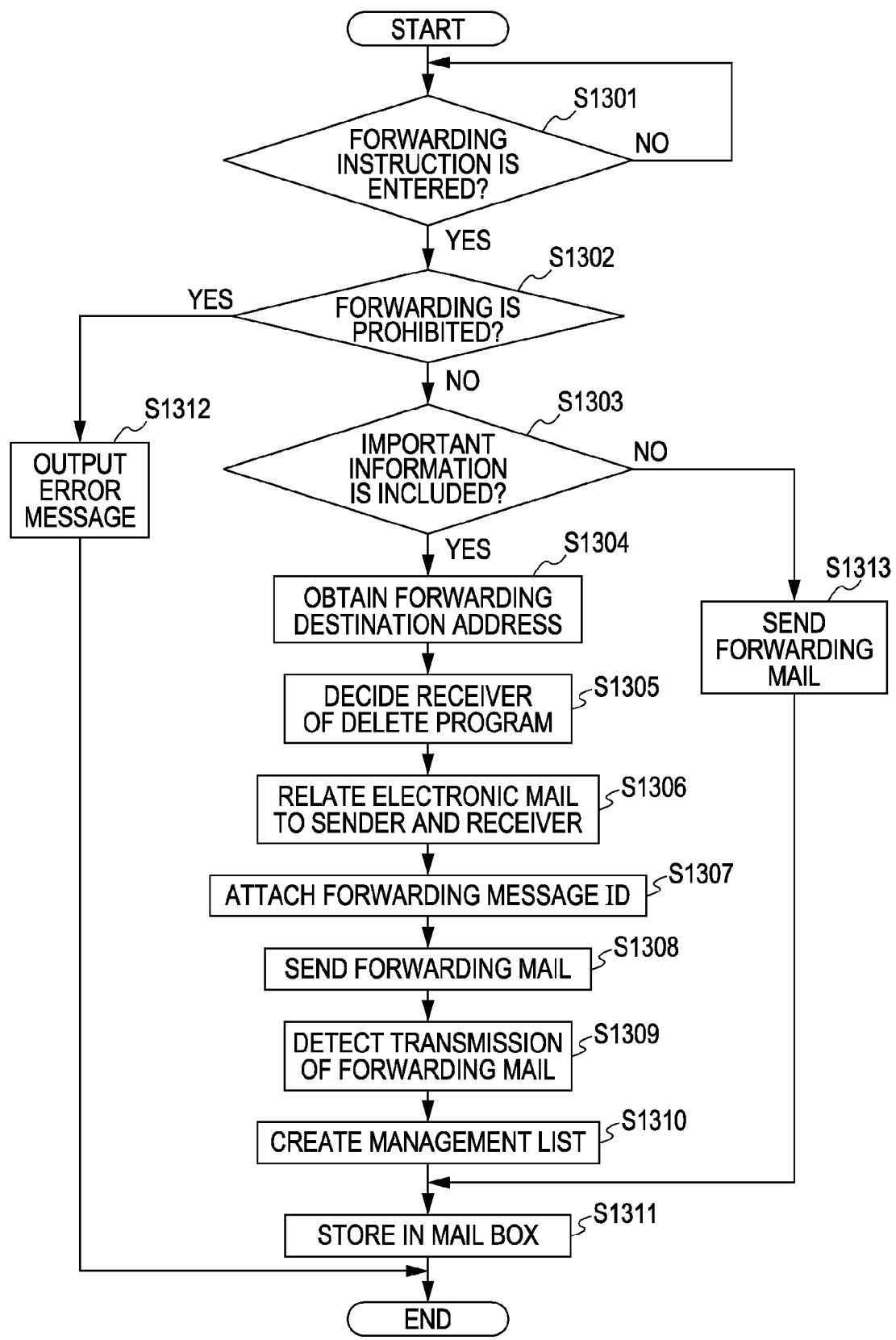
FIG. 13 is a flow chart depicting an example of a forwarding procedure in the communication terminal.

Next, the forwarding procedure of the communication terminal 101 will be described. FIG. 13 is a flow chart depicting an example of the forwarding procedure in the communication terminal. In the flow chart of FIG. 13, it is checked whether the instruction of sending the forwarding mail of the electronic mail stored in the mail box 110 has been inputted or not (Step S1301).

Input of the instruction of sending the forwarding mail is monitored (Step S1301: No), and when the instruction is inputted (Step S1301: Yes), the judging unit 512 judges whether the forwarding of the electronic mail is prohibited or not, according to the attribute flag set in the header information of the electronic mail (Step S1302).

When forwarding of the electronic mail is not prohibited (Step S1302: No), the judging unit 512 judges whether the forwarding mail includes important information, according to the attribute flag set in the header information of the electronic mail (Step S1303).

When the mail includes the important information (Step S1303: Yes), the obtaining unit 503 obtains the address of the forwarding destination set in the forwarding mail (Step S1304). Then, the deciding unit 504 designates the address obtained in Step S1304 as the receiver of the delete program for deleting the forwarding mail (Step S1305).

Next, the relating unit 505 relates the electronic mail to the sender of the electronic mail and the receiver of the delete program decided in Step S1305 (Step S1306). Then, the sending unit 502 sends the forwarding mail to the forwarding destination (Step S1308), with the forwarding message ID attached to the header information of the forwarding mail (Step S1307).

Then, the detecting unit 506 detects the transmission of the forwarding mail (Step S1309), and based on the result obtained in Step S1306, the creating unit 507 creates a management list depicting the status information for indicating whether the forwarding mail has been sent, the sender of the electronic mail, and the receiver of the delete program, which are related to each other (Step S1310).

At last, the forwarding mail sent in Step S1308 is stored in the mail box 110 (Step S1311), and the process according to the flow chart is completed. Here, the sent forwarding mail may be stored in the access-controlled sent box.

In Step S1302, when the forwarding of the mail is prohibited (Step S1302: Yes), the outputting unit 508 outputs an error message to the effect that the forwarding is prohibited, to the display 431 (Step S1312), and the process according to the flow chart is completed.

In Step S1303, when the mail does not include any important information (Step S1303: No), the sending unit 502 sends the forwarding mail (Step S1313) and stores the sent forwarding mail in the mail box 110 (Step S1311), and the process according to the flow chart is completed.

As mentioned above, by relating the sender to the receiver of the delete program for deleting the forwarding mail in every forwarding mail, the receiver of the delete instruction mail of the forwarding mail may be specified automatically upon receipt of the delete instruction of the electronic mail from the sender.

(Receiving Procedure)

Figure 14A:
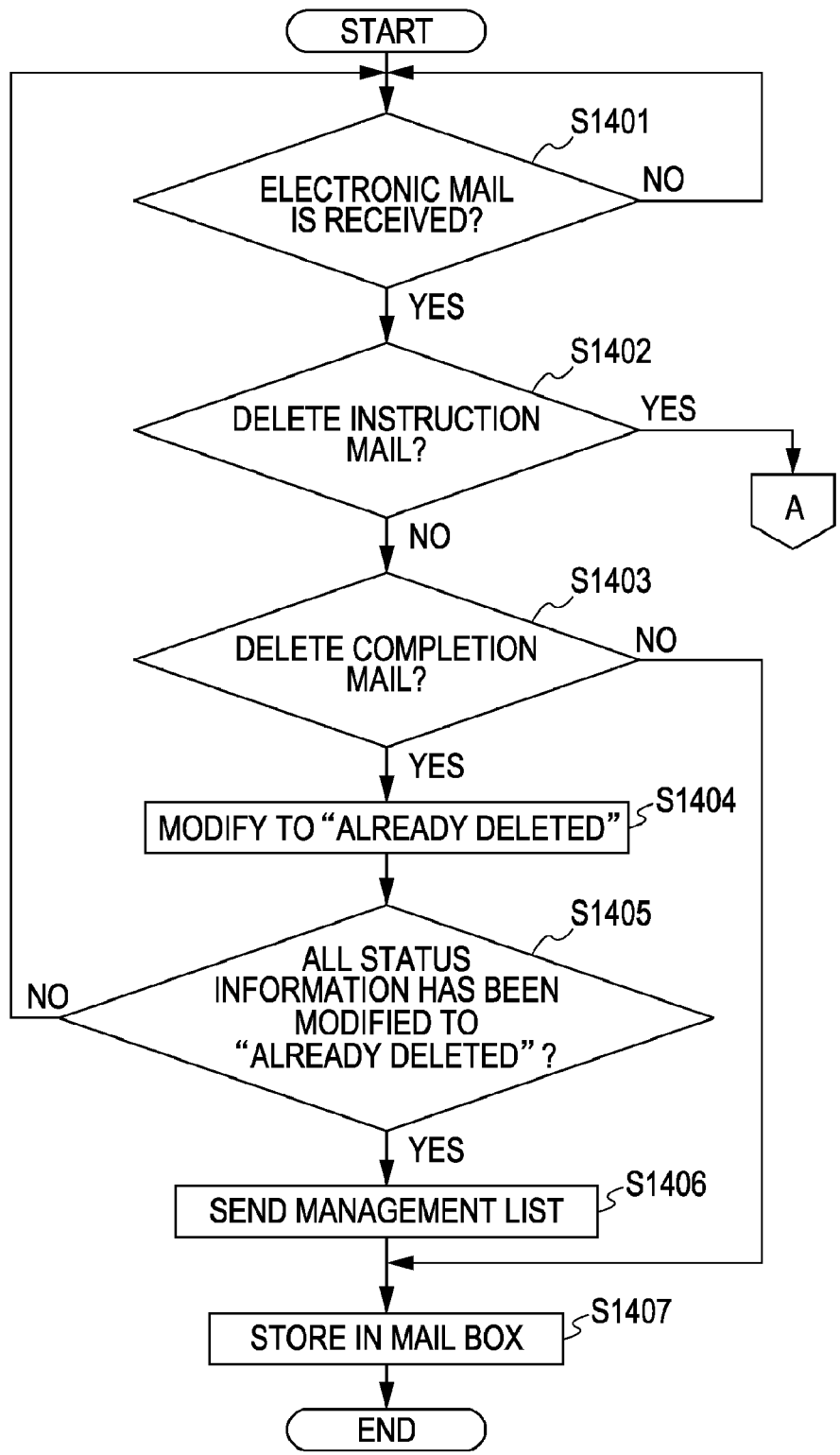
FIGS. 14A and 14B are a flow chart depicting an example of a receiving procedure in the communication terminal.
Figure 14B:
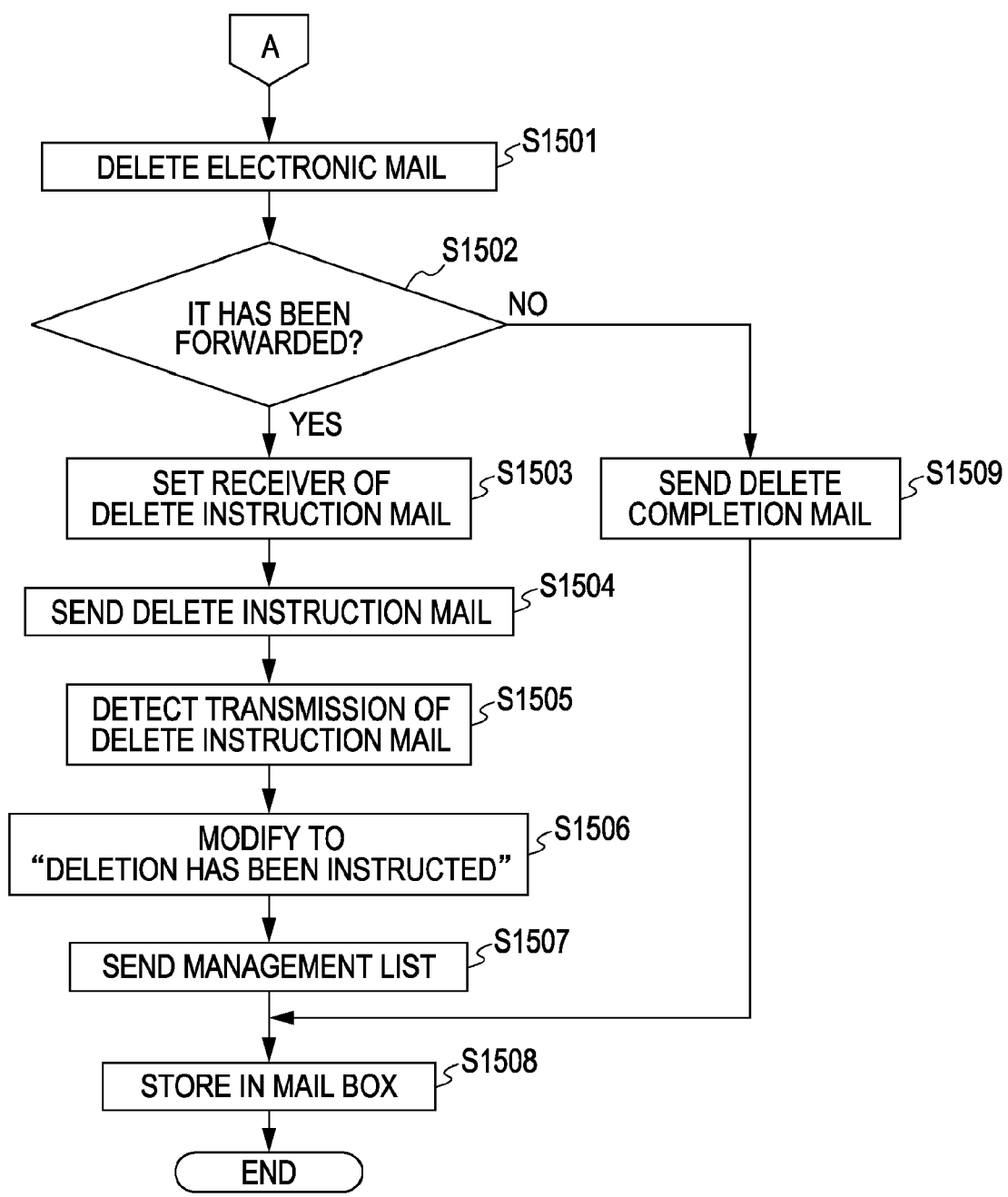

Next, the receiving procedure in the communication terminal 101 will be described. FIG. 14 is a flow chart depicting an example of the receiving procedure in the communication terminal. In the flow chart of FIG. 14, at first, it is checked whether the receiving unit 501 has received an electronic mail or not (Step S1401).

Receipt of the electronic mail is monitored (Step S1401: No), and when it is received (Step S1401: Yes), it is checked whether the detecting unit 506 detected the receipt of the delete instruction mail about the instruction for deleting the electronic mail stored in the mail box 110 (Step S1402).

When the receipt of the delete instruction mail is not detected (Step S1402: No), it is checked whether or not the detecting unit 506 detected the receipt of the delete completion mail depicting the completion of deleting the forwarding mail stored in the mail box 110 (Step S1403).

When receipt of the delete completion mail is detected (Step S1403: Yes), the modifying unit 510 modifies the status information of the management list created in Step S1310 depicted in FIG. 13 to the state in which the forwarding mail has been deleted, according to the header information of the received delete completion mail (Step S1404).

The judging unit 512 judges whether or not all the status information of the management list has been modified to the state in which the forwarding mail has been deleted, according to the result of the modification by the modifying unit 510 (Step S1405). When all the status information has not been modified (Step S1405: No), the process returns to Step S1401.

On the other hand, when all the status information has been modified (Step S1405: Yes), the sending unit 502 sends the modified management list to the sender (Step S1406), and at last, the electronic mail received in Step S1401 is stored in the mail box 110 (Step S1407). Then, the process according to the flow chart is completed.

In Step S1403, when the receipt of the delete completion mail in not detected (Step S1403: No), the electronic mail received in Step S1401 is stored in the mail box 110 (Step S1407), and the process according to the flow chart is completed.

In Step S1402, when the detecting unit 506 detects the receipt of the delete instruction mail (Step S1402: Yes), the process moves to Step S1501.

In Step S1501, the deleting unit 511 executes the delete program attached to the delete instruction mail detected in Step S1402 and deletes the electronic mail specified from the header information of the delete instruction mail, from the mail box 110.

Then, by referring to the management list created in Step S1310 depicted in FIG. 13, it is checked whether or not the electronic mail, specified according to the header information of the delete instruction mail whose receipt is detected in Step S1402, has been forwarded (Step S1502).

When the electronic mail has been forwarded (Step S1502: Yes), the setting unit 512 sets the receiver of the delete instruction mail with the instruction to delete the forwarding mail (with the delete program attached thereto) to the receiver of the delete program identified in Step S1305 depicted in FIG. 13 (Step S1503).

The sending unit 502 sends the delete instruction mail of the forwarding mail to the receiver set in Step S1503 (Step S1504). Then, the detecting unit 506 detects the transmission of the delete instruction mail of the forwarding mail (Step S1505) and the modifying unit 510 modifies the status information of the management list to the state in which the deletion of the forwarding mail has been instructed (Step S1506).

Next, the sending unit 502 sends the modified management list with the status information modified in Step S1506 to the sender of the electronic mail (Step S1507). At last, the electronic mail received in Step S1401 depicted in FIG. 14 is stored in the mail box 110 (Step S1508) and the process according to the flow chart depicted in FIG. 14 is completed.

In Step S1502, when the electronic mail has not been forwarded yet (Step S1502: No), the sending unit 502 sends the delete completion mail depicted the completion of deleting the electronic mail which has been deleted in Step S1501 to the sender of the electronic mail (Step S1509) and the process moves to Step S1508.

As mentioned above, when the delete instruction mail of an electronic mail is received from the sender, the electronic mail stored in the mail box 110 is automatically deleted and the delete completion mail depicting the completion of deleting the electronic mail may be sent to the sender automatically. When the delete instruction mail of an electronic mail is received from the sender, the delete instruction mail of the forwarding mail can be automatically sent to the forwarding destination.

As set forth hereinabove, according to the embodiment, when a sender makes an instruction of deleting an electronic mail, a receiver of the delete instruction mail of the forwarding mail can be automatically specified, hence to reduce the work load in the destination setting of the delete instruction mail of the forwarding mail.

Further, when a sender makes an instruction of deleting an electronic mail, the delete instruction mail of the forwarding mail can be automatically sent to the forwarding destination, hence to prevent it from missing the instruction of deleting a forwarding mail and failing in its deletion. Further, by referring to the management list, a sender can grasp the forwarding status of an electronic mail, the sending status of a delete instruction mail of a forwarding mail, and the deleting status of a forwarding mail.

As mentioned above, according to the embodiment, it is possible to reduce the workload in the management of the specified electronic mails including the important information and to improve the security from the viewpoint of management.

The electronic mail management method described in the embodiment can be realized by a computer such as a personal computer or a workstation executing a predetermined program which is previously prepared. The program is recorded in a recording medium which is readable by the computer such as a hard disk, a flexible disk, a CD-ROM, an MO, and a DVD and the computer reads the program from the recording medium in order to execute it. The program may be a transfer medium which may be distributed through a network such as the Internet.

What is claimed is:

1. A non-transitory medium with an electronic mail management program recorded, for causing a computer, which sends a forwarding mail of an electronic mail received from a sender, to execute a process comprising:
   obtaining an address set in the forwarding mail;
   deciding whether the address obtained by the obtaining is a receiver of a delete program for deleting the forwarding mail;
   relating the electronic mail to the sender and relating the electronic mail to the receiver of the delete program decided by the deciding;
   detecting transmission of the forwarding mail;
   detecting receipt of a first delete instruction mail containing an instruction to delete the electronic mail and having a delete program attached thereto, the first delete instruction mail being sent by the sender;
   setting a receiver of a second delete instruction mail containing an instruction to delete the forwarding mail and having the delete program attached thereto, as the receiver of the delete program decided by the deciding; and
   sending the second delete instruction mail,
   wherein the setting sets the receiver of the second delete instruction mail when the detecting receipt detects the receipt of the first delete instruction mail, and
   wherein the sending sends the second delete instruction mail to the receiver set by the setting.

2. The non-transitory medium with the electronic mail management program recorded, according to claim 1, for running the computer, the process further comprising:
   creating a management list for depicting status information indicating whether the forwarding mail has been sent, the sender, and the receiver of the delete program, which are related to each other, according to the result obtained by the relating, when the detecting detects the transmission of the forwarding mail; and
   outputting the management list created by the creating unit.

3. The on-transitory medium with the electronic mail management program recorded, according to claim 2, the process further comprising:
   modifying the status information of the management list created by the creating,
   wherein the detecting detects the transmission of the second delete instruction mail, and
   the modifying modifies the status information to a state in which the second delete instruction mail has been sent when the detecting detects the transmission of the second delete instruction mail of the forwarding mail.

4. The non-transitory medium with the electronic mail management program recorded, according to claim 3,
   wherein the sending sends the modified management list to the sender when the modifying modifies the status information.

5. The non-transitory medium with the electronic mail management program recorded, according to claim 3, the process further comprising:
   deleting the electronic mail by executing the delete program attached to the first delete instruction mail when the receipt of the first delete instruction mail is detected,
   wherein the sending sends a delete completion mail indicating completion of deleting the electronic mail to the sender when the deleting deletes the electronic mail.

6. The non-transitory medium with the electronic mail management program recorded, according to claim 3,
   wherein the detecting detects the receipt of the delete completion mail indicating the completion of deleting the forwarding mail sent from the receiver of the delete program, and
   the modifying modifies the status information to a state in which the forwarding mail has been deleted when the detecting detects the receipt of the delete completion mail.

7. The non-transitory medium with the electronic mail management program recorded, according to claim 6, the process further comprising:
   judging whether all the status information of the management list has been modified to the state in which the forwarding mail has been deleted, according to the modification result by the modifying,
   wherein the sending sends the modified management list with the status information modified, to the sender when the judging judges that all the status information has been modified.

8. The non-transitory medium with the electronic mail management program recorded, according to claim 7,
   wherein the judging judges whether the electronic mail is a target candidate to be deleted, according to the header information of the electronic mail, and
   the obtaining obtains the address set in the forwarding mail when the judging judges that the electronic mail is the target candidate to be deleted.

9. The non-transitory medium with the electronic mail management program recorded, according to claim 7, the process further comprising:
   prohibiting forwarding of the electronic mail,
   wherein the judging judges whether the forwarding of the electronic mail is possible or not, according to the header information, and
   the prohibiting prohibits the forwarding of the electronic mail when the judging judges that the forwarding of the electronic mail is impossible.

10. A communication terminal which sends a forwarding mail of an electronic mail received from a sender, the communication terminal comprising:

an obtaining unit which obtains an address set in the forwarding mail;

a deciding unit which decides whether the address obtained by the obtaining unit is a receiver of a delete program for deleting the forwarding mail;

a relating unit which relates the electronic mail to the sender relates the electronic mail to and the receiver of the delete program identified by the deciding unit;

a detecting unit which detects transmission of the forwarding mail and detects receipt of a first delete instruction mail containing an instruction to delete the electronic mail and having a delete program attached thereto;

a setting unit which sets a receiver of a second delete instruction mail containing an instruction to delete the forwarding mail and having the delete program attached thereto, as the receiver of the delete program decided by the deciding unit; and a sending unit which sends the second delete instruction mail, the setting unit sets a receiver of the second delete instruction mail when the detecting unit detects the receipt of the first delete instruction mail, and the sending unit sends the second delete instruction mail to the receiver set by the setting unit.

11. An electronic mail management method of sending a forwarding mail of an electronic mail received from a sender, the electronic mail management method comprising:

an obtaining process for obtaining an address set in the forwarding mail;

a deciding process for deciding whether the address obtained in the obtaining process as a receiver of a delete program for deleting the forwarding mail;

a relating process for relating the electronic mail to the sender and the electronic mail to the receiver of the delete program identified in the deciding process;

a detecting process for detecting transmission of the forwarding mail and detecting receipt of a first delete instruction mail containing an instruction to delete the electronic mail and having a delete program attached thereto;

a setting process for setting a receiver of a second delete instruction mail containing an instruction to delete the forwarding mail and having the delete program attached thereto, as the receiver of the delete program decided by the deciding process; and a sending process for sending the second delete instruction mail of the forwarding mail, the setting process sets a receiver of the second delete instruction mail when the detecting process detects the receipt of the first delete instruction mail, and the sending process sends the second delete instruction mail to the receiver set by the setting process.

* * * * *